United States Patent [19]

Sarangdhar

[11] Patent Number: 5,751,995
[45] Date of Patent: May 12, 1998

[54] APPARATUS AND METHOD OF MAINTAINING PROCESSOR ORDERING IN A MULTIPROCESSOR SYSTEM WHICH INCLUDES ONE OR MORE PROCESSORS THAT EXECUTE INSTRUCTIONS SPECULATIVELY

[75] Inventor: Nitin V. Sarangdhar, Beaverton, Oreg.

[73] Assignee: Intel Corporation, Santa Clara, Calif.

[21] Appl. No.: 591,224

[22] Filed: Jan. 18, 1996

Related U.S. Application Data

[63] Continuation of Ser. No. 177,259, Jan. 4, 1994, abandoned.

[51] Int. Cl.⁶ .................................................. G06F 12/08
[52] U.S. Cl. ........................... 395/472; 395/473; 395/450; 395/457
[58] Field of Search ............................. 395/200.08, 403, 395/440, 444, 447, 448, 450–452, 457, 872, 875, 468–473

[56] References Cited

U.S. PATENT DOCUMENTS

| | | | |
|---|---|---|---|
| 4,959,777 | 9/1990 | Holman, Jr. | 395/468 |
| 5,191,649 | 3/1993 | Cadambi et al. | 395/200.05 |
| 5,297,269 | 3/1994 | Donaldson et al. | 395/472 |
| 5,301,281 | 4/1994 | Kennedy | 395/307 |
| 5,313,609 | 5/1994 | Baylor et al. | 395/448 |
| 5,377,341 | 12/1994 | Kaneko et al. | 395/496 |
| 5,394,555 | 2/1995 | Hunter et al. | 395/800 |
| 5,421,022 | 5/1995 | McKeen et al. | 395/800 |
| 5,561,780 | 10/1996 | Glew et al. | 395/453 |
| 5,572,704 | 11/1996 | Brennan et al. | 395/888 |

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.

Michael Slater, Microprocessor Report, v7, n14, p. 11(5), Oct. 25, 1993.

"Superscalar Microprocessor Design" by Mike Johnson, Advanced Micro Devices, Prentice Hall, 1991.

*Primary Examiner*—Matthew M. Kim
*Attorney, Agent, or Firm*—Blakely, Sokoloff, Taylor & Zafman

[57] ABSTRACT

In a computer system having a plurality of processors, an apparatus and method for maintaining processor ordering associated with read and write operations of these processors. When data from a producer processor is initially retired, it is stored in a FIFO buffer internal to that processor. If that processor subsequently wishes access to that data, the data is retrieved from and stored back to the FIFO. The data temporarily stored in the FIFO is used to update a main memory shared by the plurality of processors. This update function occurs only after the data has been globally observed in order to guarantee that if any other processor in the system reads data from the main memory, it will obtain an updated version of that data. This ensures that the processor ordering is maintained with respect to the multiple processors residing within the computer system.

24 Claims, 6 Drawing Sheets

APPARATUS AND METHOD OF MAINTAINING PROCESSOR ORDERING IN A MULTIPROCESSOR SYSTEM WHICH INCLUDES ONE OR MORE PROCESSORS THAT EXECUTE INSTRUCTIONS SPECULATIVELY

This is a continuation of application Ser. No. 08/177,259, filed Jan. 4, 1994, now abandoned.

FIELD OF THE INVENTION

The present invention relates to the field of computer systems having multiple processors. More specifically, the present invention pertains to an apparatus and method for maintaining processor ordering in a multiprocessor environment.

BACKGROUND OF THE INVENTION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, LCD, etc.

In one instance, the CPU consisted of a single semiconductor chip known as a microprocessor. This microprocessor executed the programs stored in the main memory by fetching their instructions, examining them, and then executing them one after another. Due to rapid advances in semiconductor technology, faster, more powerful and flexible microprocessors were developed to meet the demands imposed by ever more sophisticated and complex software.

In some applications multiple processors are utilized. A singularly complex task can be broken into sub-tasks. Each subtask is processed individually by a separate processor. For example, in a multiprocessor computer system, word processing can be performed as follows. One processor can be used to handle the background task of printing a document, while a different processor handles the foreground task of interfacing with a user typing on another document. Thereby, both tasks are handled in a fast, efficient manner. This use of multiple processors allows various tasks or functions to be handled by other than a single CPU so that the computing power of the overall system is enhanced. And depending on the complexity of a particular job, additional processors may be added.

Utilizing multiple processors has the added advantage that two or more processors may share the same data stored within the system. However, care must be taken to maintain processor ordering. Processor ordering is implicitly assumed by existing software written for many processor system architectures. Support for processor ordering implies that stores generated by any processor in the system are observed in the same order by all processors in the system. When a software program changes a value held in memory, it is performing a store. A number of software algorithm requiring producer-consumer relationship depend on this support to ensure proper functionality. For example, assume that processor P1 is a producer of information and processor P2 is the consumer of information. P1 performs a write operation W1 to location 1 followed by a write operation W2 to location 2. Location 2 contains a flag variable that signals that the data in location 1 is valid. Processor P2 continuously performs read operation R2 on location 2 until the flag becomes valid. After the flag is observed valid, P2 performs a read operation R1 on location 1 to read the data. In order for this algorithm to successfully execute in a multiprocessor system, the order in which W1 and W2 are written by processor P1 should be the same order in which R1 and R2 appear to be updated to processor P2.

Further complicating matters is the fact that processors often contain a small amount of dedicated memory, known as a cache. Caches are used to increase the speed of operation. In a processor having a cache, as information is called from main memory and used, it is also stored, along with its address, in a small portion of especially fast memory, usually in static random access memory (SRAM). As each new read or write command is issued, the system looks to the fast SRAM (cache) to see if the information exists. A comparison of the desired address and the addresses in the cache memory is made. If an address in the cache memory matches the address sought, then there is a hit (i.e., the information is available in the cache). The information is then accessed in the cache so that access to main memory is not required. Thereby, the command is processed much more rapidly. If the information is not available in the cache, the new data is copied from the main memory and stored in the cache for future use.

Because these caches are typically localized, these multiple memory elements in a multiprocessor computer system can (and usually do) contain multiple copies of a given data item. It is important that any processor or other agent accessing any copy of this data receives a valid data value. In other words, cache coherency in hardware must be maintained. One way to implement cache coherency involves having all caches "snoop" the memory bus traffic. Snooping refers to the act of monitoring data and address traffic for values of interest. If a processor writes memory for an address that is in the local cache, that cache will have been snooping the memory bus and will notice that it now has a stale copy of that data. That cache entry will then be invalidated. The next time that cache entry is accessed, instead of retrieving outdated data, it will incur a cache miss, and the new data will be forwarded from memory.

Processor ordering and cache coherency are especially critical for high performance processors that utilize out-of-order processing. In out-of-order processing, a software program is not necessarily executed in the same sequence as its source code was written. Once the individual micro instructions have been executed its results are stored in a temporary state. Finally macroinstructions are "retired" by committing their states to whatever permanent architectural state was designated by the original source code instruction.

Thus, there is a need for a high performance, low complexity memory interface that introduces a delay between the time a store is retired from one processor's internal core and when it becomes "globally observed" by all the other processors in the computer system. Such a memory interface should perform this function without causing processor ordering violations, while also maintaining cache coherency. It would also be preferable if such a memory interface minimizes the complexity of attendant snoop logic.

SUMMARY OF THE INVENTION

The present invention is to an apparatus and method for maintaining processor ordering associated with read and write operations in a computer system having multiple processors. When data from a given processor is initially retired, it is stored in a first-in-first-out (FIFO) buffer internal to that processor. If that processor subsequently wishes access to this data, the data is retrieved from and stored back to the FIFO. Eventually, the data temporarily stored in the FIFO is used to update a main memory shared by the multiple processors. This update function occurs only after the data has been globally observed in order to guarantee that if any other processor in the system reads data from the main memory, it will obtain an updated version of that data. This ensures that processor ordering is maintained with respect to the multiple processors residing within the computer system.

The point at which data becomes globally observed is defined by the following conditions. If the data is currently cached in one of the processors internal caches and is in an ownership state, the data is considered to be globally observed at that time. It can update the cache memory immediately. However, if it is not in an ownership state, then a write allocate operation is performed and there are three different possibilities.

In the first scenario, if the data is within a given processor bus cluster, but it is not in a modified state in any cache. For this situation, ownership of the data is guaranteed by the snoop time response of the memory. This allows the bus transaction to be globally observed.

In the second scenario, the data is within a given bus cluster and is in a modified state in another cache. In this case, ownership is guaranteed by the snoop response time of the cache. Thereby, the bus transaction can be globally observed.

In the third scenario, the data is not within the processor bus cluster. A bridge, used to couple various buses, is responsible for obtaining ownership of the cache line. This then leads to three possible outcomes. First, ownership is immediately available, and ownership of the cache line is guaranteed by the snoop result phase of the current transaction. This allows the transaction to be globally observed immediately. Second, ownership of the next level system bus is not immediately possible. Yet, if it can be obtained later, the bridge defers global observation until that time. Third, if ownership of the next level system bus is not possible, the transaction must be repeated. In other words, the transaction does not become globally observed until later.

By executing the above procedure, processor ordering can be guaranteed for any level of system hierarchies and processor clusters.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for maintaining processor ordering in a multiprocessor system is described in detail. In the following description for purposes of explanation, specific details such as processor configurations, components, bus hierarchies, etc. are set forth in order to provide a thorough understanding of the present invention. However, it will be apparent to one skilled in the art that the present invention may be practiced without these specific details. In other instances, well known structures, devices, functions, and procedures are shown in block diagram form to avoid obscuring the present invention. It should be noted that the present invention can be applied to a variety of different processor architectures. Furthermore, the present invention can be practiced in a variety of manners, such as by a single or multiple chip implementation or by fabrication by silicon or gallium arsenide or other processes.

Figure 1:
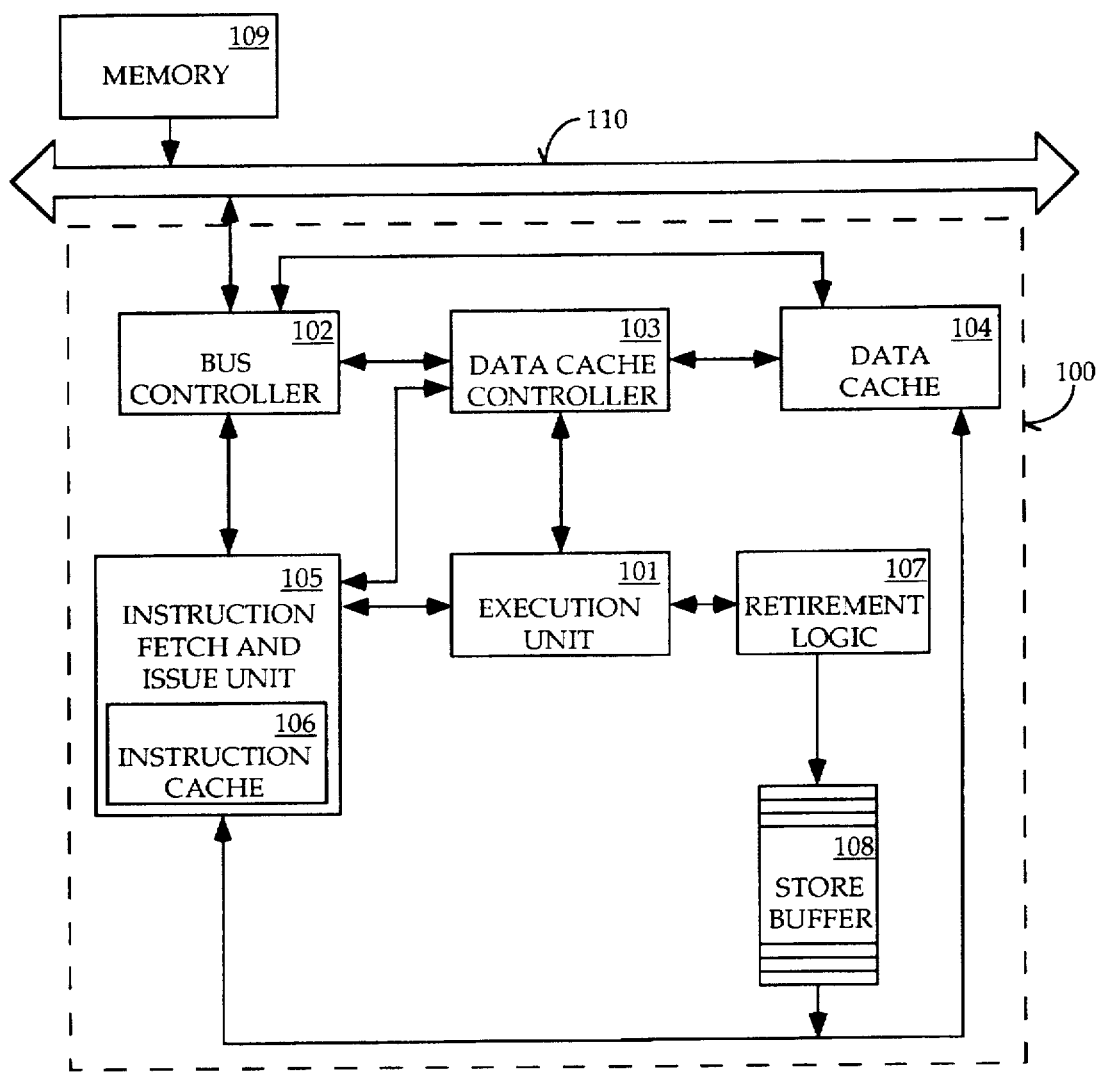
FIG. 1 is a block diagram illustrating an exemplary processor incorporating the teachings of the present invention.

Referring now to FIG. 1, a block diagram illustrating an exemplary processor 100 incorporating the teachings of the present invention is shown. The exemplary processor 100 comprises an execution unit 101, a bus controller 102, a data cache controller 103, a data cache 104, and an instruction fetch and issue unit 105 with an integrated instruction cache 106. The elements 101–106 are coupled to each other as illustrated. Together they cooperate to fetch, issue, execute, and save execution results of instructions in a pipelined manner. The instruction fetch and issue unit 105 fetches instructions from instruction cache 106, and, on a cache miss, from an external memory through the bus controller 102 via an external system bus. Bus controller 102 manages transfers of data between external components and processor 100. In addition, it also manages cache coherency transfers. The instruction fetch and issue unit 105 issues the fetched instruction to the execution unit 101. Basically, the execution unit 101 performs such functions as add, subtract, logical AND, and integer multiply. Some of these instructions are fetched and issued speculatively. The execution unit 101 holds and executes the integer and floating point instructions when their operand dependencies on execution results of preceding instructions are resolved. This includes those integer and floating point instructions that are speculatively fetched and issued. In similar fashion, the execution unit 101 holds and forwards the load and store instructions to the retirement logic 107.

Retirement logic 107 commits the states of these instructions to whatever permanent architectural state that was designated by the original source code. Load instruction execution requires data from the actual memory location. Hence loads are retired only after the data becomes available from the local buffers, caches or memory as necessary. However, store instruction execution does not have this limitation. As a result stores are retired immediately and thereupon the retired instructions are sent to store buffer 108. Store buffer 108 is a first-in-first-out (FIFO) structure for storing address, size, data, and other key attributes. The top pointer of the structure points to the store most recently retired. The bottom of store buffer 108 (i.e., the one containing the oldest retired store) is the only one ready to be written to a memory subsystem, such as data cache 104. The store buffer 108 is only visible to the processor core (e.g., execution unit 101 and instruction fetch, issue unit 105, and instruction cache 106). External snoops do not recognize the existence of the store.

Data cache controller 103 controls the access of data to/from the data cache 104. Data cache 104 is a fast, small, hardware-maintained scratchpad memory which can be reached in fewer clock cycles than main memory by loads and stores. The execution unit forwards load instructions immediately to the data cache controller 103 and the data cache 104. This is because a load instruction cannot retire until the data is available from the cache or memory subsystem. In contrast, store instructions are buffered. In other words, memory references are not necessarily forwarded in the order they were issued. Moreover, some memory load references are forwarded due to speculative execution of instructions. In any case, the execution results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores of mis-predicted branches are purged.

The instruction fetch and execution unit 105 is intended to represent a broad category of instruction fetching and issuing elements found in many computer systems. Their constitutions and functions are well known and will not be further described. In the presently preferred embodiment, the instruction fetch and issue unit 105 includes an instruction cache 106. The instruction cache 106 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 105 to decide which instruction cache entry ought to be accessed next for maximal program performance. In the currently preferred embodiment, the instruction cache 106 and data cache 104 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 103 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

In the currently preferred embodiment instruction cache 106 is a read only cache. Writes to cache 106 are rare. They need to be correctly handled but are not performance critical. The data cache 104, and cache controller 103 utilize a writeback configuration with M.E.S.I. protocol. In a writeback configuration, cache 104 is designed to minimize the amount of reads and writes to main system memory 109. These caches have tags that include a bit called the modified dirty(altered) bit. This bit is set if a cache location has been updated with new information and therefore contains information that is more recent than the corresponding information in main system memory 109.

From the description of cache states that follows it should be clear that only the stores to "E" or "M" states do not generate a bus transaction, and after the store is completed the final cache state is "M". This forms the basis of the global observation of stores when it can be satisfied completely within the cache. If the same processor reads the same location it will always be guaranteed the updated data by the cache controller. If any other processor read the same location, it would not find the address resident within its local (L1) cache; and hence, will always need to generate a bus transaction. During the snoop request corresponding to the bus transaction, the cache controller containing the data in modified state will intervene and return the updated cache line. Thus, a store written to modified (or exclusive transitional to modified) state is always globally observed. Due to the fact that data from a given memory location can reside simultaneously in main memory 109 and in one or more cache memories 104 and 105, and also the data in one cache may have a value different from that in memory because one has been updated more recently, the present invention provides a mechanism which insures that all references to a main-memory location retrieve the most recent value.

This is achieved by implementing a hardware-implemented cache consistency protocol known as M.E.S.I. (Modified, Exclusive, Shared, or Invalid). This protocol depends upon having a shared system bus 110. Furthermore, cache controller 103 must have the ability to use the same line size for all caches on the memory bus; observe all memory bus activity; maintain state information about every line of cache memory; and take appropriate action to maintain consistency. The M.E.S.I. protocol is implemented by assigning state bits for each cached line. These states are dependent upon both data transfer activities performed by the local processor as the bus master, and snooping activities performed in response to transactions generated by other bus masters.

M.E.S.I. represents 4 states. They define whether a line is valid (i.e., hit or miss), if it is available in other caches (i.e., shared or exclusive), and if it is modified (i.e., has been modified). The four states are defined as follows:

| | |
|---|---|
| [M] - MODIFIED | This state indicates a line which is exclusively available in only this cache (all other caches are I), and is modified (i.e., main memory's copy is stale). A Modified line can be read or updated locally in the cache without aquiring ownership of the memory bus. Because a Modified line is the only up-to-date copy of data, it is the cache controller's responsibility to write back this data to memory on snoop accesses to it. |
| [E] - EXCLUSIVE | Indicates a line which is exclusively available in only this cache (all other caches are I), and that this line is not modified (main memory also has a valid copy). Writing to an Exclusive line causes it to change to the Modified state and can be done without informing other caches or memory, so no memory bus activity is generated. On a snoop to E state it is the responsibility of the memory to provide data. |
| [S] - SHARED | Indicates that this line is potentially shared with other caches. The same line may exist in one or more other caches (main memory also has a valid copy). A Shared line can be read by the CPU without a main memory access. Writing to a Shared line may use two policies. Using no write allocate policy a write updates the cache, and also requires the cache controller to generate a write-through cycle to the memory bus. In addition to updating main memory, the write-through cycle will invalidate this line in other caches. Using write allocate policy a write generates an ivalidation request transaction on the memory bus. This will invalidate the line in other caches and allow the local cache to be |

| | |
|---|---|
| [I] - INVALID | updated and change to modified state. Main memory is not updated.<br>Indicates that the line is not available in the cache. A read to this cache line will be a miss and cause the cache controller to execute a line fill (i.e., fetch the entire line and deposit it into the cache SRAM). A write to this cache line may use two policies. In no write allocate policy a write will cause the cache controller to execute a write-through cycle to the memory bus. In write allocate policy a read for ownership bus transaction is executed and the line is brought in the cache in ownership state. Ater that the line is written with updated data and its state is changed to modified. |

These states determine the actions of the cache controller with regard to activity related to a line, and the state of a line may change due to those actions. All transactions which may require state changes in other caches are broadcast on the shared memory bus.

Figure 2:
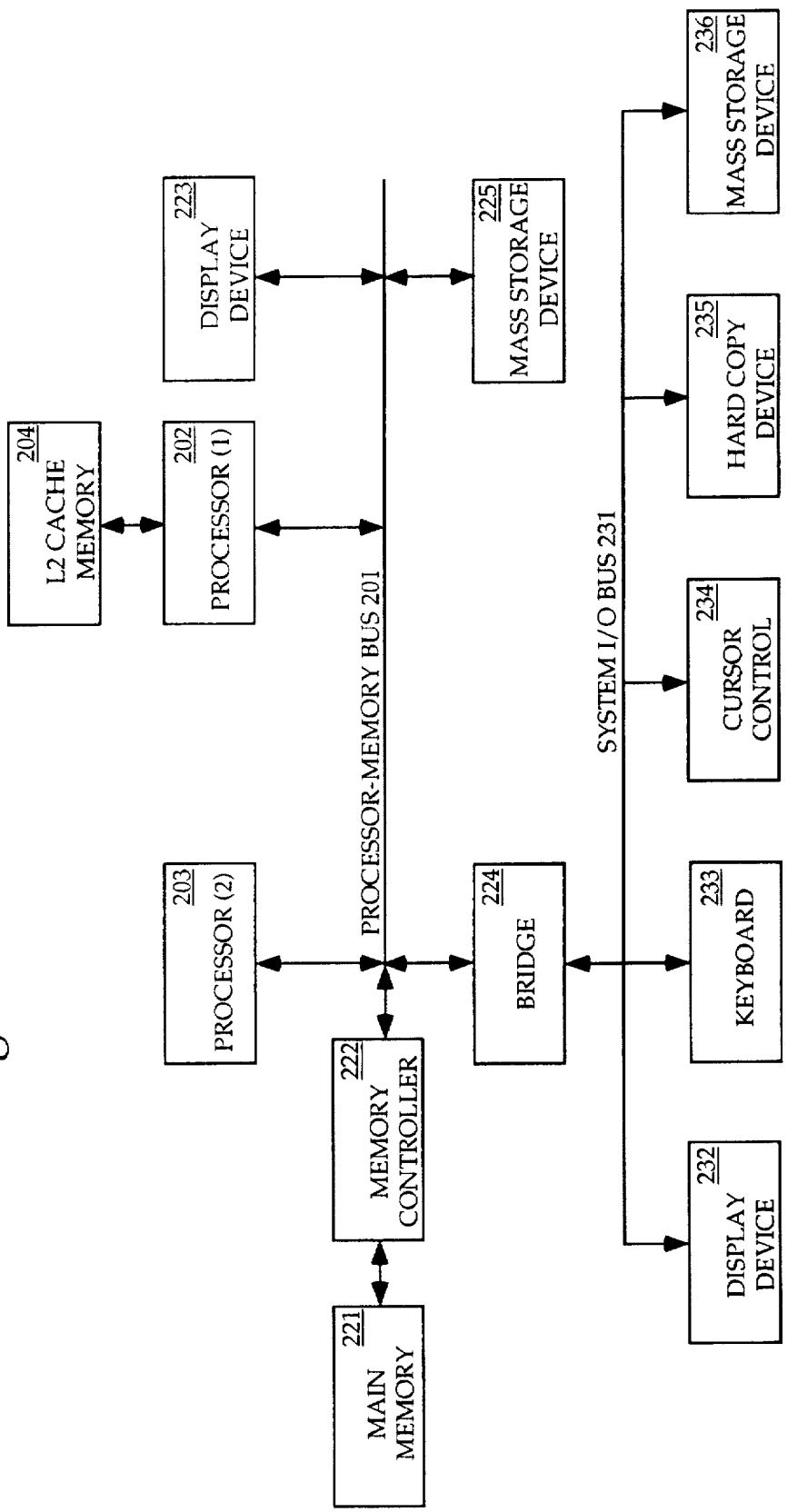
FIG. 2 shows an overview of a multiprocessor computer system upon which the present invention may be practiced.

FIG. 2 shows an overview of a multiprocessor computer system upon which the present invention may be practiced. The computer system generally comprises a processor-system bus or other communication means 201 for communicating information between one or more processors 202 and 203. Processors 202 and 203 can be of a form as shown in FIG. 1. Processor-system bus 201 includes address, data and control buses. As described above, processors 202 and 203 may include a small, extremely fast internal cache memory, commonly referred to as a level one (L1) cache memory for temporarily storing data and instructions on-chip. In addition, a bigger, slower level two (l2) cache memory 204 can be coupled to processor 202 for temporarily storing data and instructions for use by processor 202. In the currently preferred embodiment, the L1 and L2 cache memories are included in the same chip package as processor 202.

Also coupled to processor-memory bus 201 is processor 203 for processing information in conjunction with processor 202. Processor 203 may comprise a parallel processor, such as a processor similar to or the same as processor 202. Alternatively, processor 203 may comprise a co-processor, such as a digital signal processor. The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processor 202 and processor 203. Memory controller 222 maintains a strong order of read and write operations. A mass data storage device 225, such as a magnetic disk and disk drive, for storing information and instructions, and a display device 223, such as a cathode ray tube (CRT), liquid crystal display (LCD), etc., for displaying information to the computer user are coupled to processor memory bus 201.

An input/output (I/O) bridge 224 is coupled to processor memory bus 201 and system I/O bus 231 to provide a communication path or gateway for devices on either processor memory bus 201 or I/O bus 231 to access or transfer data between devices on the other bus. Essentially, bridge 224 is an interface between the system I/O bus 231 and the processor memory bus 201.

In order to reduce the bandwidth requirement, bridge 224 turns the byte/word/dword data transfer traffic from I/O bus 231 into line size traffic on processor memory bus 201.

I/O bus 231 communicates information between peripheral devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

In some implementations, it may not be required to provide a display device for displaying information. Certain implementations of the present invention may include additional processors or other components.

Figure 3:
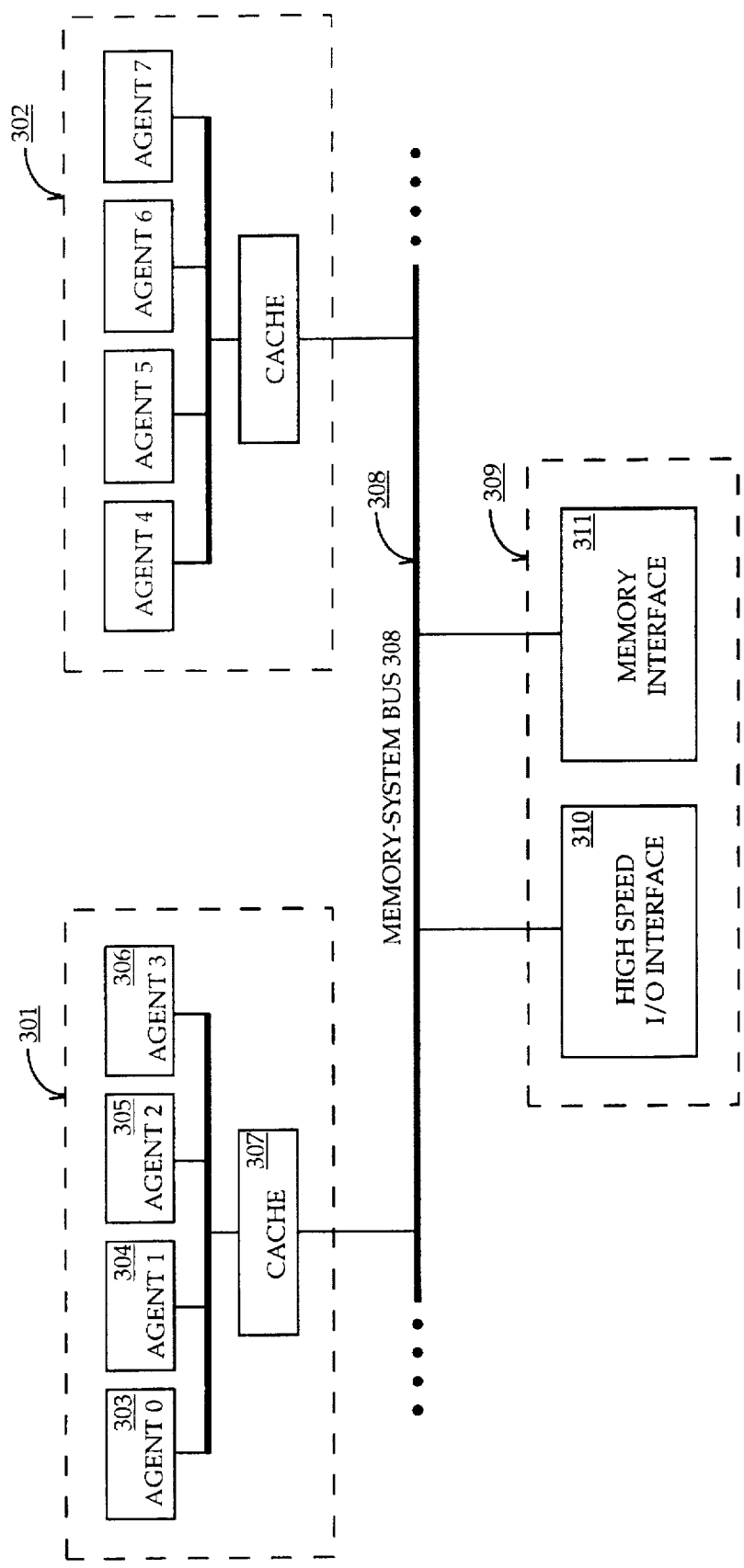
FIG. 3 is a block diagram showing a bus cluster system upon which the present invention may be practiced.

FIG. 3 is a block diagram showing a bus cluster system upon which the present invention may be practiced. The present invention can apply to multiprocessor computer systems having one or more clusters of processors. FIG. 3 shows two such clusters 301 and 302. Each of these clusters are comprised of a number of processors. For example, cluster 301 is comprised of four agents 303–306 and a cache 307. Agents 303–306 can include microprocessors, co-processors, digital signal processors, etc. Cache 307 is shared between these four agents 303–306. Each cluster is coupled to a memory system bus 308. These clusters 301–302 are coupled to various other components of the computer system through a system interface 309. The system interface 309 includes a high speed I/O interface 310 for interfacing the computer system to the outside world and a memory interface 311 which provides access to a main memory, such as a DRAM memory array (these interfaces are described in greater detail in FIG. 2).

In the present invention, processor ordering is ensured by introducing a delay between the time a store is retired from a processor's internal core and that store is globally observed in the system. Processor ordering is inherently assumed by existing software written for most processor system architectures. Support for processor ordering implies that stores generated by any processor in the system are observed in the same order by all processors of the system. In other words, the order of the stores must be maintained. Source codes requiring a producer/consumer relationship depend on this support to ensure proper functionality.

For example, assume that processor 303 is a producer of information and processor 304 is a consumer of that information being generated by processor 303. First, processor 303 performs a write operation W1 to location 1, followed by a write operation W2 to location 2. Location 2 contains a flag indicating whether the data in location 1 is valid. Subsequently, processor 304 continuously performs a read operation R2 on location 2. Once the flag is observed valid, processor 304 performs a read operation R1 on location 1 to read its data. In order for this piece of code to be successfully executed in a multiprocessor system, the order in which W1 and W2 are written by processor 303 should be the same order in which R1 and R2 appear to be updated to processor 304.

The present invention accomplishes processor ordering in a large multiprocessor computer system by implementing a high performance memory interface with a processor's core. This interface is designed to minimize impact on store retirement. Store instructions are retired immediately after they are posted in the senior store buffer (i.e., the FIFO). Since retirement does not require a cache/memory access, it is a single cycle operation. The contents of the cache/memory system remain unchanged.

While two consecutive stores (i.e., W1 and W2) have retired in the senior store buffer, the existence of the stores is visible only to the producer processor and not to any consumer processors. If the producer processor reads from the same address locations, it is forwarded to the core directly from the store buffer. This mechanism is known as "load forwarding." Note that this mechanism maintains processor ordering of the processor with respect to its own writes. At this time, if any consumer processor in the system reads from the two locations, neither will reflect the effect of the two stores. This ensures that the processor ordering is maintained for the two writes with respect to all other processors. The senior stores as retired, exit the store buffer one at a time. This causes a memory system update. Hence, the W1 store is guaranteed to be the first to exit the senior store buffer. No subsequent store is allowed to exit the senior store buffer until the store is globally observed. Beyond this point, if any processor in the system reads the same location, it is guaranteed to see the updated value of the location.

Depending on where the store address resides in the system, the global observation takes place at different times. Assuming that the address is currently cached in a processor's internal caches and is in ownership state (i.e., the Exclusive or Modified states), the store can update the memory immediately. The store is then globally observed.

In a second scenario, the address is within writeback cacheable memory space but is not currently in the ownership state (Shared or Invalid state) and it exists in the same bus cluster. In this situation, a write allocate operation is performed on the processor bus. Following the write allocation operation, there are three different possibilities which may occur applicable to FIGS. 2 or 3. In the first case, the address is owned within the same processor bus cluster and is not in the Modified state in any other writeback cache. For this case, the ownership of the address is guaranteed by the snoop response time by the memory controller (22 or 307 for that transaction). This allows the bus transaction to be globally observed. In a second case, the address is owned within the same processor bus cluster and is in the Modified state in another cache (203 or 303). In this second case, the ownership of the address is guaranteed by the snoop response of the transaction associated with the cache. This allows the bus transaction to be globally observed.

In a third scenario only applicable to FIG. 3, the address is not owned within the processor bus cluster and is either in a different cluster or system memory which is reached via the bridge on the current cluster. In such a case the L3 cache 307 is responsible for obtaining ownership of the cache line. Once again there are three cases as described in detail below.

In the first instance, the ownership of the next level system bus 308 is immediately available. Consequently, the ownership of the cache line can be guaranteed by the snoop result phase of the current transaction. This allows the transaction to be immediately globally observed. In a second instance, the ownership of the next level system bus 308 is not immediately possible, and yet, it can be obtained at a later time. Furthermore, the cache line can be returned back to the requesting processor. In this instance, the L3 cache 307 defers global observation of the transaction. When the next level system bus ownership is finally obtained, the L3 cache 307 returns the ownership of the cache line with a deferred reply. During the snoop response phase of the deferred reply the transaction globally is observed. Finally, ownership of the next level system bus 308 might not be possible in order to avoid a deadlock. Hence, the transaction is aborted and retried one more time. The transaction is "not" globally observed until the retried transaction is successfully completed. The retried transaction is globally observed based on the case it falls under during retry.

It should be noted that write, W1, is allowed to be globally observed first before the actual write operation takes place. Any agent attempting a read operation, R1, on the same data is always guaranteed the new data if the read takes place after the global observation of the write transaction on the processor. Conversely, the read operation, R1, will retrieve the old data if the read takes place before global observation of the W1 write transaction. Only after W1 is globally observed, is it then allowed to exit the senior store buffer. After W2 exits the senior store buffer, a similar process is repeated for W2 in order to make the store globally observed. Only after W2 is globally observed will any read operation R2, taking place on the data, read the new value of the data. Note that if R2 reads the new data which indicates an updated flag, to indicate a valid data in location 2, and R1 is a read operation initiated after R2, it is always guaranteed to receive the correct new data. In the present invention, these steps can be extended to any level of system hierarchies and processor cluster to guarantee processor ordering throughout the entire system.

Figure 4A:
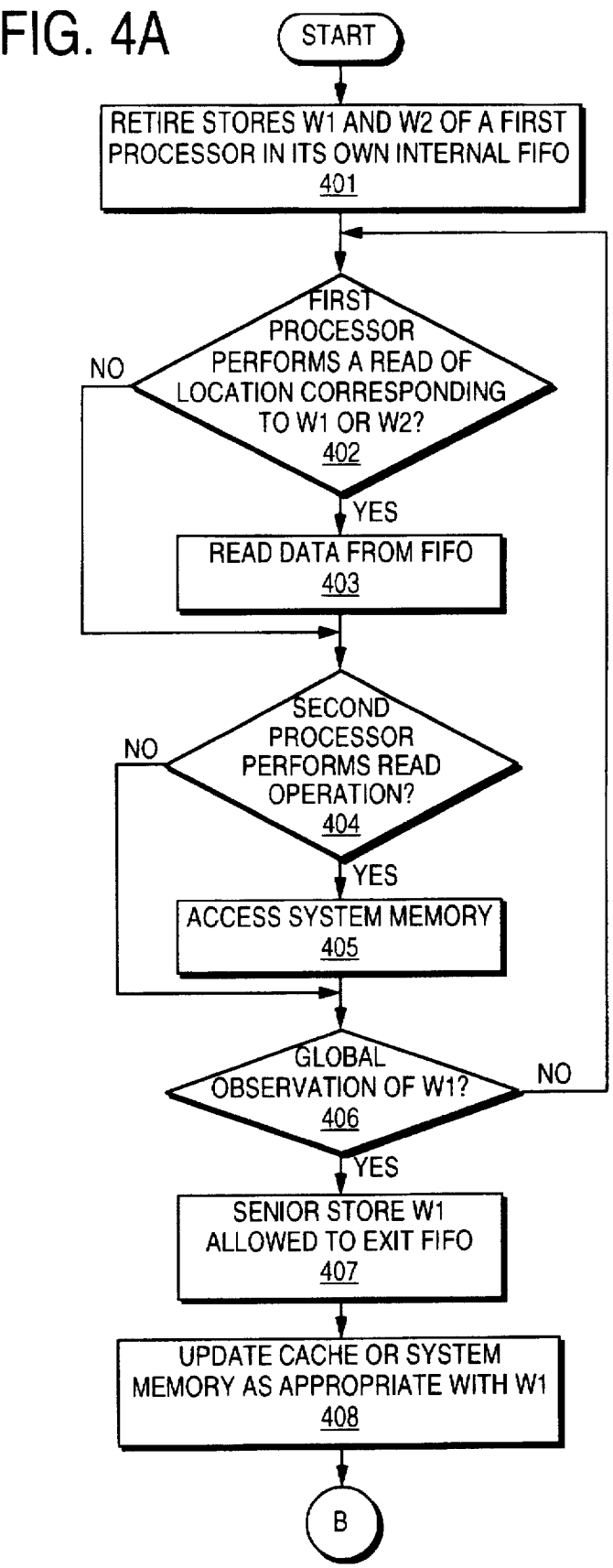
FIGS. 4A–4B are flowcharts describing the steps for ensuring processor ordering in a multiprocessor computer system.
Figure 4B:
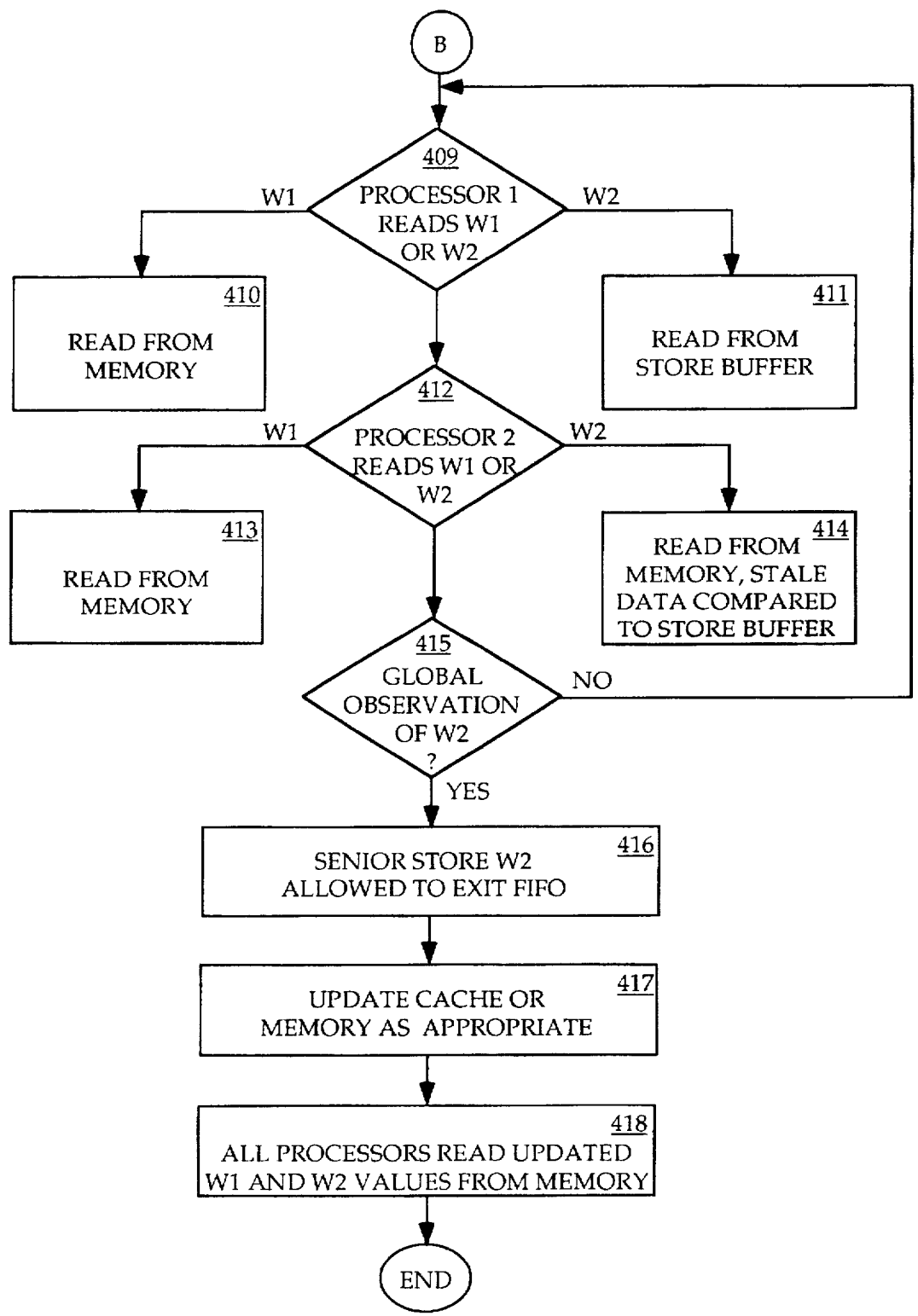

FIG. 4 is a flowchart describing the steps for ensuring processor ordering in a multiprocessor computer system. Although the flowchart only references a first processor that produces information and a second processor that consumes information, the same set of steps can readily be applied to any number of producer and consumer processors. Note that in one instance, a processor can be a producer of information while, in another instance, it can become a consumer of information being generated by some other processor.

Initially, instructions or data, such as stores W1 and W2, retired by the first processor is stored internally in a senior store buffer, step 401. The senior store buffer takes the form of a FIFO, such as buffer 108 of FIG. 1. A senior store is defined as a store operation that has been retired by the retirement logic, but which has not yet been dispatched to the data cache. The store is maintained in an entry in the senior store buffer. If step 402 determines that the first processor wishes to perform a read to the location corresponding to the addresses of W1 and W2, the data is read directly from the FIFO, step 403. The combination of steps 402 and 403 is known as load forwarding. In other words, load forwarding occurs when a load finds a store in the FIFO which is targeting the load's address. By implementing a FIFO and load forwarding in this manner, processor ordering with respect to the first processor's own write operations is maintained.

Now, suppose that it is determined that some other processor in the system wishes to read from those addresses, step 404. This read operation accesses the system memory (not the FIFO), step 405. Note that the data or instruction retrieved will not be affected by the store performed by the first processor's load forwarding operation, hence, processor ordering is maintained for the store operation of step 401 with respect to any other processor in the system.

In step 406, a determination is made as to whether a senior store has been globally observed by the system. The global observation set forth in step 406 is defined as the condition wherein if any processor in the system reads a given location, it is guaranteed to see the updated value for that location. Steps 402–405 are followed if that store has not yet been globally observed. If that store, N1, has been globally observed, it is allowed to exit the FIFO, step 407. The cache or system memory as appropriate with W1 is updated with the senior store, step 408. In step 409, the first processor reads either W1 or W2. W1 is read from memory, step 410, while W2 is read from the store buffer, step 411. Similarly, the second processor reads either W1 or W2, step 412. W1 is read from memory, step 413. W2 is read from memory, and the stale data is compared to the data in the store buffer, step 414. Next, a determination is made as to whether W2 has been globally observed, step 415. If W2 has not been globally observed, steps 409–414 are repeated. Otherwise, the senior store W2 is allowed to exit the FIFO, step 416. Thereupon, the cache or memory is updated accordingly, step 417. Thereby, all processors can read the updated W1 and W2 values from memory, step 418.

Figure 5:
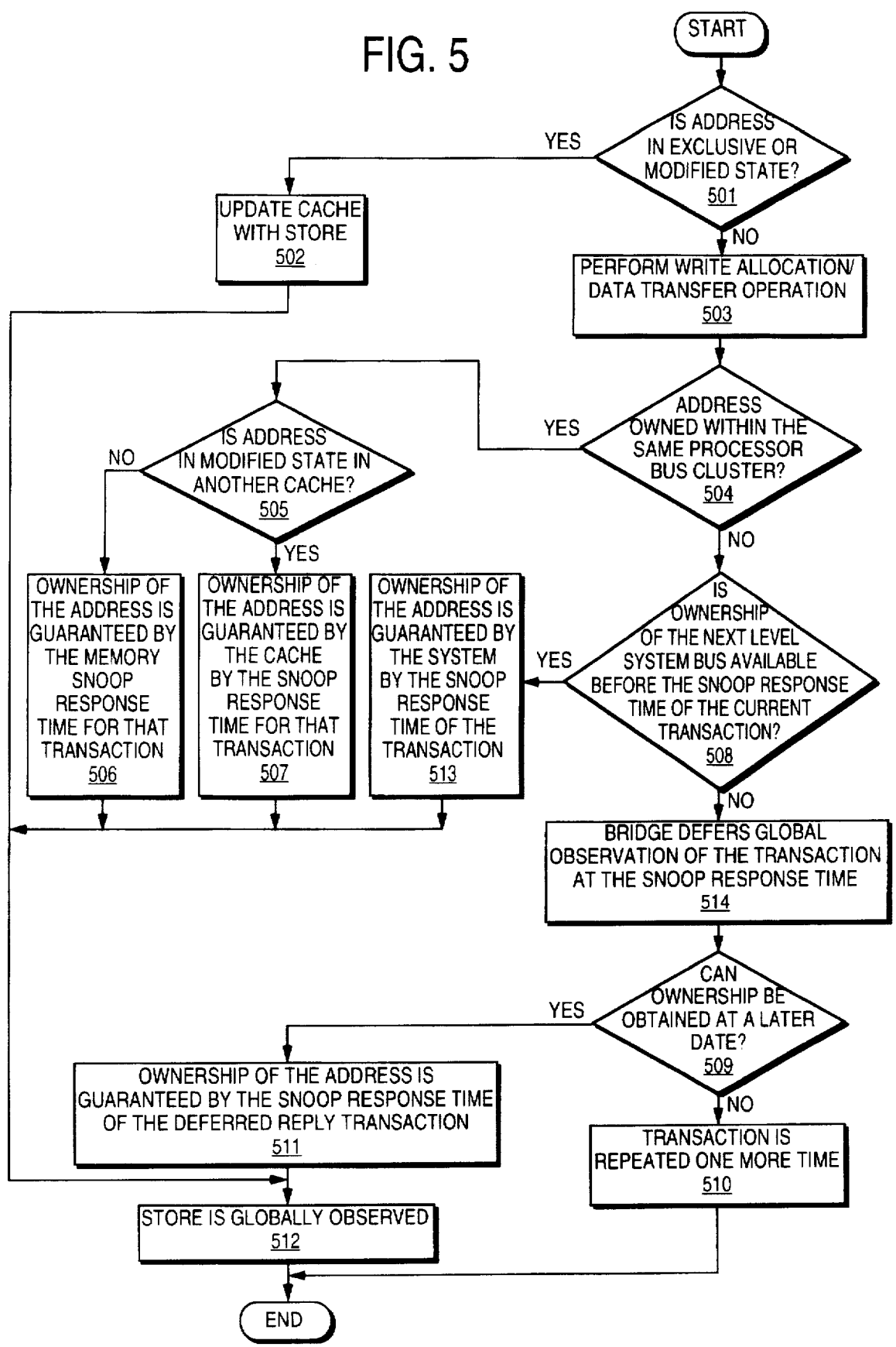
FIG. 5 is a flowchart showing the steps for determining when a store has been globally observed.

FIG. 5 is a flowchart showing the steps for determining when a store has been globally observed. In step 501, a determination is made as to whether the store address is in ownership (i.e., Exclusive or Modified state). If the address is either in the Exclusive or Modified state, the cache is updated with the store, step 502. Thereupon, the store is globally observed, step 512. However, if the address is not in ownership (i.e., Shared or Invalid) a write allocation operation is performed, step 503. Next, a determination is made as to whether the address is owned within the same processor bus cluster, step 504. If it is within the same processor bus cluster, step 505 makes a determination as to whether the address is in the Modified state in any other cache. If not, the ownership of the address is guaranteed by the memory by the snoop response time for that transaction, step 506. Thereupon, the store is globally observed, step 512. Otherwise, given that the address is in a Modified state in another cache, the ownership of that address is guaranteed by the cache by snoop response time for that transaction, step 507. At that time, the store is globally observed, step 512.

If it were determined in step 504 that the address is not owned within the same processor bus cluster, then a determination is made as to whether ownership of the next level system bus is available before the snoop response time of the current transaction, step 508. If so, then the ownership of the address is guaranteed by the system by the response time of the transaction, step 513. Thereupon, the store is globally observed by the snoop response time of the next level system bus, step 512. Otherwise, the bridge defers global observation of the transaction at the snoop response time, step 514. In step 509, a determination is made as to whether ownership can be obtained at a later time. If ownership can be obtained later, ownership of the address is guaranteed by the snoop response time of the deferred reply transaction. The store is then globally observed, step 512. If it is determined that ownership of the next level system bus is not possible, the transaction must be repeated, step 510. Thus, an apparatus and method of maintaining processor ordering in a multiprocessor system is disclosed.

What is claimed is:

1. In a multiprocessor (MP) computer system comprising a plurality of processors that store data in a memory hierarchy and which transfer data on a system bus, the memory hierarchy including a system memory and cache memory and at least a first processor executing instructions speculatively, a method of performing memory operations comprising the steps of:

(a) storing data associated with a first write operation (STORE1) and a second write operation (STORE2) in a buffer of the first processor in retiring the first and second write operations, said STORE1 and STORE2 being associated with respective address locations in the memory hierarchy;

(b) issuing STORE1 from said buffer;

(c) globally observing the STORE1 to indicate to the plurality of processors that the address location associated with the STORE1 will receive updated data, said global observation based on a Modified (M), Exclusive (E), Shared (S), and Invalid (I) protocol state implemented in said memory hierarchy; and (d) issuing the STORE2 from the buffer, after global observation of STORE1.

2. The method of claim 1 further comprising the step of:

(d) updating the data stored at the address location associated with the STORE1 in at least one of the system memory or the cache memory with the STORE1 data.

3. The method of claim 2 further comprising the step of:

(e) initiating, by the first processor, a read operation to the address location associated with the STORE2; and (f) reading, by the first processor, the updated data associated with the STORE2 from the FIFO buffer.

4. The method of claim 2 further comprising the step of:

(e) initiating, by the first processor, a read operation to the address location associated with the STORE2; and (f) reading, by the first processor, the updated data from the address location associated with the STORE1 from at least one of the system and cache memories.

5. The method of claim 4 further comprising the step of:

(g) reading, by the second processor, the updated data from the address location associated with the STORE1 from at least one of the system and cache memories.

6. The method of claim 5 further comprising the steps of:

(h) globally observing the STORE2;

(i) exiting the STORE2 from the FIFO buffer;

(j) updating the data stored at the address location associated with the STORE2 in at least one of the system memory or the cache memory with the STORE2 data;

(k) reading, by the first and second processors, the updated data for the address locations associated with the STORE1 and STORE2 data in an order said STORE1 and STORE2 were originally written by the first processor.

7. The method of claim 1 further comprising the steps, prior to step (b) of:

initiating, by the first processor, a read operation to the address location associated with the STORE1; and reading, by the first processor, the updated data for the address location associated with the STORE1 from the buffer.

8. The method according to claim 1 further comprising the steps, prior to step (b), of:

initiating, by a second processor of said plurality of processors, a read operation to the address location associated with the STORE1; and reading, by the second processor, the updated data from the address location associated with the STORE1 from at least one of the system and cache memories.

9. The method of claim 1 wherein the cache memory in the memory hierarchy comprises a first data cache associated with the first processor, and each line in the data cache has bits that identify either a modified (M), and exclusive (E), a shared (S), or an invalid (I) protocol state, and step (b) further comprises the steps of:

globally observing the STORE1 in response to determining an address location in the first data cache for STORE1 is in the M or E state.

10. The method of claim 9 wherein the first processor is grouped in a first bus cluster coupled to the system bus via the first data cache.

11. The method of claim 10 wherein the first bus cluster further includes the second processor.

12. The method of claim 11 wherein step (c) further comprises the steps of:
   determining that an address location for STORE1 in said first data cache is in the S or I state;
   performing a write allocation operation from the first data cache;
   determining that the STORE1 is owned within the first bus cluster.

13. The method of claims 1, 2, 7, 8, 3, 4, 5 or 6 wherein the cache memory in the memory hierarchy comprises a first data cache associated with a first processor, each line in the data cache having bits which identify either a modified (M), an exclusive (E), a shared (S), or an invalid (I) protocol state.

14. In a multiprocessor (MP) system comprising a plurality of processors, each having an internal data cache operating in accordance with a MESI-based protocol, the processors being organized into clusters comprising one or more processors, each cluster being coupled to a memory via a memory bus which, in turn, is coupled to a system bus, at least a first processor in a first cluster executing instructions speculatively, a method of maintaining processor ordering, said method comprising the steps of:
   (a) storing data associated with a first write operation (STORE1) and a second write operation (STORE2) in a buffer in a first processor in retiring STORE1 and STORE2;
   (b) issuing STORE1 from said buffer
   (c) designating the STORE1 to be globally observed, following any of the steps of:
      (1) determining that the address location of the STORE1 is in the internal data cache of the first processor in the M or E state; or
      (2) (i) determining that the address location of the STORE1 is owned by a local memory within the first cluster in the E, S, or I state; and
      (ii) waiting for a snoop response time of a current transaction to the address location of the STORE1;
      (3) (i) determining that the address location of the STORE1 is owned by a cache in a second processor in said first cluster in the M state; and
      (ii) waiting for a snoop response time of a current transaction to the address location of the STORE1; or
      (4) (i) determining that the address location is not owned within the first cluster; and
      (ii) obtaining ownership of the cache line from a remote memory; and
      (iii) waiting for a snoop response time of a current transaction to the address location of the STORE1; and
   (d) issuing STORE2 from said buffer after global observation of STORE1.

15. In a multiprocessor (MP) system comprising a plurality of processors, each having an internal data cache operating in accordance with a MESI-based protocol, the processors being organized into clusters comprising one or more processors, each cluster being coupled to a memory via a memory bus which, in turn, is coupled to a system bus, at least a first processor in a first cluster executing instructions speculatively, a method of maintaining processor ordering, said method comprising the steps of:
   (a) storing data associated with a first write operation (STORE1) and a second write operation (STORE2) in a buffer in a first processor in retiring STORE1 and STORE2;
   (b) issuing STORE1 from said buffer
   (c) designating the STORE1 to be globally observed, following any of the steps of:
      (1) determining that the address location of the STORE1 is in the internal data cache of the first processor in either the M or E state; or
      (2) (i) determining that the address location of the STORE1 is owned within the first cluster in the E, S, or I state; and
      (ii) waiting for a snoop response time of a current transaction to the address location of the STORE1; or
      (3) (i) determining that the address location is not owned within the first cluster;
      (ii) allowing said current transaction to be decoupled from said system bus using transactional deferral;
      (iii) obtaining ownership of a cache line of remote memory; and
      (iv) waiting for a snoop response time of a deferred reply transaction to the address location of the STORE1; and
   (d) issuing STORE2 from said buffer after global observation of STORE1.

16. In a multiprocessor (MP) system comprising a plurality of processors, each having an internal data cache operating in accordance with a MESI-based protocol, the processors being organized into clusters comprising one or more processors, each cluster being coupled to a memory via a memory bus which, in turn, is coupled to a system bus, at least a first processor in a first cluster executing instructions speculatively, a method of maintaining processor ordering, said method comprising the steps of:
   (a) storing data associated with a first write operation (STORE1) and a second write operation (STORE2) in a buffer in a first processor in retiring STORE1 and STORE2;
   (b) issuing STORE1 from said buffer
   (c) designating the STORE1 to be globally observed, following any of the steps of:
      (1) determining that the address location of the STORE1 is in the internal data cache of the first processor in either the M or E state; or
      (2) (i) determining that the address location of the STORE1 is owned within the first cluster in the E, S, or I state; and
      (ii) waiting for a snoop response time of a current transaction to the address location of the STORE1; or
      (3) (i) determining that the address location is not owned within the first cluster; and
      (ii) repeating the current transaction to the address location of the STORE1; and
   (d) issuing STORE2 from said buffer after global observation of STORE1.

17. The method of claim 14, 15 or 16 further comprising the step of:
   (e) updating the memory with the STORE1 data.

18. The method of claim 14, 15 or 16 further comprising the step of:

(e) updating a system memory with the STORE1 data.

19. A multiprocessor (MP) system comprising:

a plurality of processors, at least a first processor executing instructions speculatively and including logic for retiring instructions which comprises a first-in-first-out (FIFO) buffer that holds a first write operation (STORE1) and a second write operation (STORE2) in retiring STORE1 and STORE2;

a memory hierarchy including a system memory and cache memory, the cache memory comprising a first data cache associated with the first processor, each line in the first data cache having bits which identify either a modified (M), an exclusive (E), a shared (S), or an invalid (I) protocol state;

a system bus coupled to the processors and the memory hierarchy for transferring information there between;

logic coupled to the system bus for globally observing the STORE1 as having updated data, said global observation based on a Modified (M), Exclusive (E), Shared (S), Invalid (I) protocol state implemented in said memory hierarchy, and issuing STORE2 from said buffer after global observation of STORE1.

20. The MP system of claim 19 wherein the logic further globally observes the STORE1 after the first processor determines that the address location of the STORE1 is owned within the first cluster in the E, S, or I state and a snoop response completes for a current transaction to the address location of the STORE1.

21. The MP system of claim 19 wherein the logic further globally observes the STORE1 after the first processor determines that the address location is not owned within the first cluster, obtains ownership of a cache line from a remote memory of a second cluster, and a snoop response completes for a current transaction to the address location of the STORE1.

22. The MP system of claim 21 wherein the logic further globally observes the STORE1 after the first processor determines that the address location is not owned within the first cluster, relinquishes ownership of said system bus, obtains ownership of a cache line of a remote memory, and a snoop response completes for a deferred reply transaction to the address location of the STORE1.

23. The MP system of claim 22 wherein the logic further globally observes the STORE1 after the first processor determines that the address location is not owned within the first cluster and the current transaction is repeated.

24. The MP system of claim 19 wherein the logic further globally observes the STORE1 after the first processor determines that the address location of the STORE1 is owned within the first cluster in the E, S, or I state and a snoop response completes for a current transaction to the address location of the STORE1.

* * * * *